United States Patent [19]

Goldberg et al.

[11] Patent Number: 5,161,147

[45] Date of Patent: * Nov. 3, 1992

[54] HIGH SPEED INFORMATION SYSTEM UTILIZING SCANNING TUNNELING MICROSCOPY IN CONJUNCTION WITH A MODULATED LIGHT SOURCE

[75] Inventors: Harris A. Goldberg, Colonia, N.J.; Ronald G. Reifenberger, Tippecanoe, Ind.

[73] Assignee: Hoechst Celanese Corp., Somerville, N.J.

[ * ] Notice: The portion of the term of this patent subsequent to Sep. 24, 2008 has been disclaimed.

[21] Appl. No.: 400,841

[22] Filed: Aug. 30, 1989

[51] Int. Cl.$^5$ .................. G11B 7/00; G01N 23/00
[52] U.S. Cl. ................... 369/100; 369/126; 250/307
[58] Field of Search ............ 369/101, 126, 173, 275.1, 369/283, 285, 100; 365/118, 157; 360/77.07; 250/306, 307, 311, 442.1, 492.1

[56] References Cited

U.S. PATENT DOCUMENTS

| | | | |
|---|---|---|---|
| 4,343,993 | 8/1982 | Binnig | 250/306 X |
| 4,678,736 | 7/1987 | Hanamura | 369/275.1 X |
| 4,719,613 | 1/1988 | Hirose | 369/275.1 X |
| 4,826,732 | 5/1989 | Kazan | 369/126 X |
| 4,829,507 | 5/1989 | Kazan | 369/126 X |
| 4,837,435 | 6/1989 | Sakuhara | 250/307 X |
| 4,907,195 | 3/1990 | Kazan | 250/306 X |
| 4,916,688 | 4/1990 | Forster | 369/126 X |
| 4,950,638 | 8/1990 | Yayama | 503/226 X |

FOREIGN PATENT DOCUMENTS

| | | |
|---|---|---|
| 0212705 | 3/1987 | European Pat. Off. . |
| 0296262 | 12/1988 | European Pat. Off. . |
| 0305033 | 3/1989 | European Pat. Off. . |

OTHER PUBLICATIONS

Patent Abstracts of Japan, vol. 6, No. 237 (p-157)(1115) Nov. 25, 1982, & JP-A-57 135445 (Tokyo Shibaura Denki K.K.) Aug. 21, 1982;
Research Disclosure 28130, Sep. 1987, Hampshire, England, p. 548 Anonymous: "Data Storage System".
IBM Technical Disclosure Bulletin, vol. 32, No. 2, Jul. 1989, N.Y. US pp. 285-286: "Information Storage With Scanning Tunneling Microscope".
Journal of Vacuum Science and Technology: Part A, vol. 6, No. 2, Mar. 1988, N.Y. US pp. 466-469.
L. Arnold et al: "Laser-Frequency Mixing Using The Scanning Tunneling Microscope".

*Primary Examiner*—Roy N. Envall, Jr.
*Assistant Examiner*—Nabil Hindi
*Attorney, Agent, or Firm*—Michael W. Ferrell

[57] ABSTRACT

Provided is a method for recording information utilizing a scanning tunneling microscope in conjunction with a modulated light source. The method comprises providing an information medium having an information layer as its topmost layer, and passing the tip of a scanning tunneling microscope over the surface of the information medium in conjunction with the tip of the scanning tunneling microscope and/or the surface of the information medium being irradiated with light from a focused light source. The irradiation is modulated in accordance with the information to be recorded such that a detectable change, e.g., a chemical or physical change is induced in the information layer of the medium to create a track of recorded bits of information. The method provides one with the ability to record information with the spatial resolution permitted by a scanning tunneling microscope and with the speed of an optical recording system.

5 Claims, 1 Drawing Sheet

HIGH SPEED INFORMATION SYSTEM UTILIZING SCANNING TUNNELING MICROSCOPY IN CONJUNCTION WITH A MODULATED LIGHT SOURCE

BACKGROUND OF THE INVENTION

The present invention relates to the recordation of information in an information medium. More specifically, the present invention relates to a method of recording information utilizing a scanning tunneling microscope in conjunction with a modulated light source.

Scanning tunneling microscopy is a fairly recent development, with Gerd Binnig and Heinrich Rohrer having received the 1986 Nobel Prize in physics for its development. While the early designs of this microscope were both cumbersome and delicate, recent improvements have led to scanning tunneling microscope (STM) units which are both compact and robust.

One important component of the STM unit is a piezoelectric positioning device that is capable of rastering a sharp metallic tip with subnanometer resolution across a sample of interest. The piezoelectric positioner can take many shapes and is often comprised of a set of three orthogonal piezoelectric bars or a single piezoelectric tube which has been sectioned into four quadrants. In addition to moving the tip across the sample, the piezoelectric positioning device must also maintain a constant distance between the tip and sample. This feature of all STMs requires a very sensitive height detector.

In an STM, the height detector relies on the quantum mechanical nature of the tunneling current that flows between the tip and sample. In order to set up a tunneling current, the tip must be about 0.5 nm above the sample. It is well established that the tunneling current varies exponentially with distance such that a change in tip-to-sample distance of 0.1 nm causes about a factor of ten change in tunneling current. This exquisite sensitivity of the tunneling current to the tip-sample separation is used as a feedback signal to the piezoelectric positioner, thus allowing the tip-to-sample separation to be held constant to better than 0.01 nm.

A suitably designed STM unit can be quite small and STMs as small as one centimeter in diameter have been built. The piezoelectric positioner and tip assembly must be carefully isolated from vibrations and this is often accomplished by suspending the STM with spring-like supports. Often, two or three levels of vibration isolation are incorporated. However, by making the physical size of the instrument small and designing the piezoelectric positioner into a highly symmetric holder, the severe requirements on vibration isolation can be reduced to a manageable and easily achievable level.

The second requirement for a stable instrument is a high degree of temperature compensation. This is desirable because even a temperature gradient as small as 0.01K can cause unacceptably large drifts due to the uncontrolled thermal expansion of the piezoelectric positioner. Thus by carefully balancing the thermal expansion of the structural elements of the instrument against the expansion properties of the piezoelectric material, a high degree of temperature compensation can be automatically achieved, resulting in a constant tip-to-sample distance even while operating in an ambient air environment.

Based on recent developments in the design of STM instruments, it is anticipated that smaller, more stable, and more compact scanning assemblies will be developed within the foreseeable future. These STMs will routinely allow experiments at a length scale unimaginable only a few years ago. Of considerable current interest is the ability of the STM to modify in a controlled way the properties of matter at the nanometer length scale. In fact, the physical principles underlying the STM have already provided a means to alter and fabricate structures at the atomic level. Further background and detail with regard to the development and operation of a scanning tunneling microscopy is also found in the paper "Scanning Tunneling Microscopy - From Birth to Adolescence", by Gerd Binnig and Heinrich Rohrer, reprinted in *Rev. Mod. Phys.*, Volume 59, No. 3, Part I, July, 1987.

Electron tunneling is the phenomenon that underlies the operation of the scanning tunneling microscope. An electron cloud generally occupies a space between the surface of the sample and the needle tip used in the microscope. The cloud is a consequence of the indeterminacy of the electron's location (a result of its wave-like properties). Because the electron is "smeared out", there is a probability that it can lie beyond the surface boundary of a conductor. The density of the electron cloud decreases exponentially with distance. A voltage-induced flow of electrons through the cloud is therefore extremely sensitive to the distance between the surface of the sample, and the scanning needle tip.

To scan the surface of a sample the tip of the needle is pushed toward the sample until the electron clouds of each gently touch. The application of a voltage between the tip and the sample causes electrons to flow through a narrow channel in the electron clouds. This flow is called the tunneling current. A change in the distance between the scanning needle tip and the surface of the sample by an amount equal to the diameter of a single atom causes a tunneling current to change by a factor as much as 1,000. Thus, extremely precise measurements of the vertical positions of the atoms on the sample surface may be obtained.

As the tip is swept across the surface of a sample, a feedback mechanism generally senses the tunneling current and maintains the tip a constant height above the surface atoms. In this way, the tip follows the contours of the surface. The motion of the tip is read and processed by a computer and is displayed on a screen or a plotter. By sweeping the tip through a pattern of parallel lines, a three-dimensional image of the surface is obtained. When operated in a high resolution mode, a distance of ten centimeters on the image generally represents the distance of ten angstroms on the surface, which translates into a magnification of one hundred million.

Due to the extraordinary sensitivity of the scanning tunneling microscope, it has become an important tool in surface science and physics in general. Its primary use has been to obtain atomic-resolution images of surfaces. However, efforts have also been used to manipulate materials as well as image them. See, for example, "Molecular Manipulation Using a Tunneling Microscope", by J. S. Foster, J. E. Frommer and J. C. Arnett, *Nature.* Volume 331, Jan. 28, 1988, Page 324; and, "Atomic-Scale Engineering" by J. B. Pethica, *Nature.* Volume 331, Jan. 28, 1988, Page 301.

The scanning tunneling microscope has also been applied in lithography. For example, lithography with a scanning tunneling microscope has been demonstrated by fabricating submicron lines using a "contamination process" and a Langmuir-Blodgett film as resists. Lithography using metal halide films and polymethylmethacrylate films have also been studied. For example, see McCord and Pease, *J. Vac. Sci. Technol.* B5(1), January/February, 1987, Page 430 and *J. Vac. Sci. Technol.* B, Volume 6, No. 1, January/February, 1988, Page 293; and, Li et al, *Appl. Phys. Lett.,* Vol. 54, 1424 (1989).

The high resolution available through the application of a scanning tunneling microscope is certainly a most desirable attribute. However, for purposes of mass data storage, the writing and reading capabilities of a scanning tunneling microscope are much too slow for any practical application. This inherent slowness of the device is due to the limited practical rate at which one could successfully modulate the voltage of the scanning tunneling microscope tip. If one could utilize a method for recording information which is as fast as optical recording methods, yet which permits one to realize the unique spatial resolution of a scanning tunneling microscope, a most impressive system would be obtained.

Accordingly, it is an object of the present invention to employ a scanning tunneling microscope in the recordation of information on an information medium.

It is another object of the present invention to employ a novel method of recording information utilizing a scanning tunneling microscope.

It is still a further object of the present invention to provide a method which permits the recordation of information with high spatial resolution and with high writing speeds.

Yet another object of the present invention is to provide a novel medium containing a high density of information recorded therein.

Still another object of the present invention is to provide a method for recording information with the spatial resolution permitted by a scanning tunneling microscope and with the speed of an optical recording system.

These and other objects of the present invention will become apparent upon a review of the following specification the claims appended hereto.

SUMMARY OF THE INVENTION

In accordance with the foregoing objectives, there is provided by the present invention a novel method of recording information in an information medium which has as its topmost layer an information layer. The method comprises providing such an information medium having an information layer as its topmost layer, and passing a tip of the scanning tunneling microscope over the surface of the information medium in conjunction with the tip of a scanning tunneling microscope and/or the surface of the information medium being irradiated with light from a focused light source, with the focused light source being modulated in accordance with the information to be recorded such that a chemical or physical change is induced in the information layer of the medium to create a track of recorded bits of information.

In a preferred embodiment of the present invention, the focused light source is focused upon the surface of the information medium, and specifically on the material directly underneath the tip of the scanning tunneling microscope.

In a most preferred embodiment of the present invention, said information layer is comprised of a material which exhibits a first excited state and a second excited state, with excitation to the second excited state resulting in a chemical or physical change in the material. The tip of the scanning tunneling microscope is passed over the surface of the information medium with sufficient voltage so as to excite the material directly underneath the tip to its first excited state. Irradiation of the information medium is of the material directly underneath the tip of the scanning tunneling microscope and occurs substantially simultaneously with the passage of the tip of the scanning tunneling microscope over any particular point of the information medium. Said irradiation is also of sufficient frequency and intensity to excite the material from its first excited state to its second excited state. As a result of the combination of the passage of the scanning tunneling microscope and the irradiation, which is modulated in accordance with the information to be recorded, information is recorded in the medium in the form of a chemical or physical change. It is understood that information is recorded only in an area determined by the overlap of the laser illumination and the STM tunneling current.

In another preferred embodiment, recordation of information takes place upon passing the tip of a scanning tunneling microscope over the surface of the information medium in conjunction with the tip being irradiated with light from a focused light source. The scanning tunneling microscope is of a voltage insufficient to result in a chemical or physical change of the material in the information layer, while the light from the focused light source is modulated in accordance with the information to be recorded and is of sufficient frequency and intensity to impart to the electrons in the tip sufficient additional energy such that the tunneling of the electrons results in a physical or chemical change in the information layer of the medium in accordance with the information to be recorded.

BRIEF DESCRIPTION OF DRAWING

In the present invention is described in detail below with reference to the single figure which is a schematic view of an optical recording system constructed in accordance with the present invention.

DETAILED DESCRIPTION OF THE PREFERRED EMBODIMENTS

Figure 1:
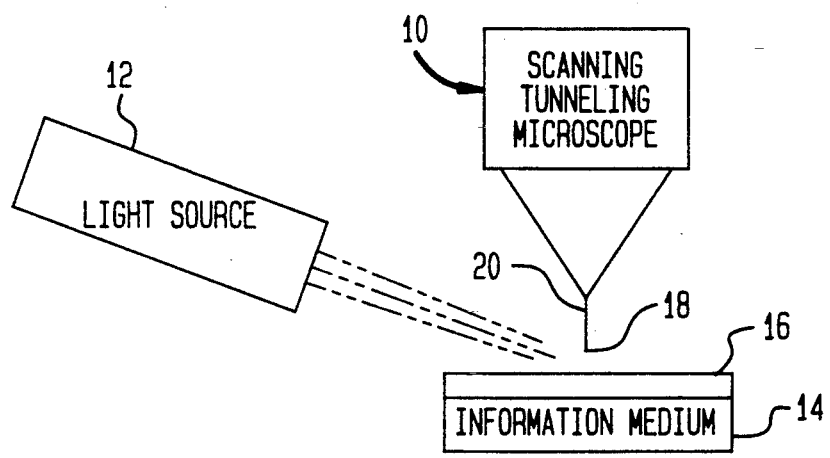

The present invention utilizes the combination of a scanning tunneling microscope 10 and a focused light source 12 for recording information in an information medium 14 which has as its topmost layer 16 the information layer. By utilizing the unique resolution available from the scanning tunneling microscope, and the modulation speed of the focused light source, a surprisingly efficient and effective method is provided for recording information in analog or digital form.

The scanning tunneling microscope employed in the method of the present invention is the instrument developed by Gerd Binnig and Heinrich Rohrer, or any similar device. The tip 18 of the needle 20 of the scanning tunneling microscope is pushed toward the information layer until the electron clouds of each gently touch. The application of a voltage between the tip and the information medium causes electrons to flow through a narrow channel in the electron cloud. It is this flow which is the tunneling current. In the method of the present invention, the voltage applied is generally under 10 volts, and it is typically around 1 volt. The particular voltage, of course, will depend upon the particular constituency of the recording medium in which the information is to be recorded, and the focused light source employed in conjunction with the microscope.

The application of the voltage is generally maintained at a constant level. The real advantage of using the scanning tunneling microscope is its resolution. For instance, the resolution available when using a focused diode laser to mark a surface is generally from 2,000 angstroms to 1 micron. By using the scanning tunneling microscope, a resolution ranging from 10 to 500 angstroms, and preferably from 10 to 100 angstroms (in linear length of the information bit to be recorded) can be realized. This would translate into a density of information ranging from $10^{12}$ to $10^{14}$ bits/square centimeter, i.e., 1000-100,000 gigabytes per square centimeter. Such a density level is far superior to anything heretofore known in the recordation of information.

The modulation of the energy imparted to the recording medium, in accordance with the information to be recorded therein, is generally achieved through the modulation of the focused light source, e.g., a diode laser. The particular laser or light source chosen is dependent upon the wavelength which will be absorbed by the information layer of the recording medium. The energy provided by the focused light source is generally insufficient to result in any recordation of information in the information layer, and it is only through the combination of the energy imparted by the scanning tunneling microscope together with the focused light source that information is recorded. Thus, through modulating the light source in accordance with the information to be recorded in the medium, the information can be written with the speed at which the light source can be modulated. Accordingly, in the practice of the present invention, one can achieve the spatial resolution benefits of a scanning tunneling microscope, while realizing the modulation (writing) speeds of a focused light source.

The material component of the information layer employed in the present method can be any material which undergoes a chemical or physical change upon having sufficient energy imparted thereto. Such materials can be metallic, semiconducting or organic. Organic materials are preferred.

Among the most preferred organic materials are aza-annulene compounds or fluorescent dyes. Other organic materials suitable for use in the practice of the present invention include the following types of compounds:

a stilbene compound, e.g., $C_6H_5-CH=CH-C_6H_5$
azobenzene compound, e.g., $C_6H_5-N=N-C_6H_5$
or anil compound, e.g., $C_6H_5-N=CH-C_6H_5$ The foregoing compounds have been found to be particularly useful when the irradiation is focused on the STM tip in order to excite the electrons in the tip.

Such organic materials can be solvent cast, e.g., spin coated, onto the information medium in order to form a very smooth information layer. In addition, the organic materials can be coated using Langmuir-Blodgett techniques. This allows one or several molecular layers to be coated in a well-controlled manner. Or, such materials can be vacuum deposited, as metallic materials can be. The ease with which organic materials can be coated to a controlled thickness, however, makes such materials the preferred material for the purposes of the present invention.

In the practice of the present invention, an information medium is first provided which has an information layer as its topmost layer. The material of the information layer, as discussed above, is preferably an organic material such as an aza-annulene or a fluorescent dye. Naphthalocyanine compounds are in general the most preferred aza-annulenes for purposes of the present invention.

The tip of the scanning tunneling microscope is then passed over the surface of the information medium in conjunction with a light from a focused light source being irradiated upon the tip of the scanning tunneling microscope and/or the surface of the information medium. The focused light source is modulated in accordance with the information to be recorded such that a chemical or physical change is induced in the information layer of the medium to create a track of recorded bits of information. It is only upon sufficient energy being imparted by the combination of the scanning tunneling microscope and the focused light source that information is actually recorded in the information medium. In those places on the information medium in which information is not to be written, the modulation of the focused light source is such that the amount of energy imparted by the combination of the scanning tunneling microscope and the focused light source is insufficient to induce a chemical or physical change.

In a preferred embodiment of the present invention, the material of the information layer is a material exhibiting a first excited state and a second excited state, with excitation to the second excited state resulting in a chemical or physical change in the material. Again, such a material is preferably organic, and can be a fluorescent dye or an aza-annulene in the most preferred embodiment of the present invention. In the case of fluorescent dyes, it is important that the species created after excitation to the second excited state not fluoresce, or fluoresce at a different frequency than the original dye. Naphthalocyanines are of particular usefulness in this preferred embodiment, since many known naphthalocyanine compounds exhibit an appropriate first and second excited state.

When such an information material is employed, it is preferred that the scanning tunneling microscope is passed over the surface of the information medium in close proximity thereto, and with sufficient voltage so as to excite the material directly underneath the tip to its first excited state. The focused light source, which is used to irradiate either the surface of the information medium directly underneath the scanning tunneling microscope tip, or the tip of the scanning tunneling microscope itself, is then modulated in accordance with the information to be recorded such that when information is to be recorded, sufficient energy is provided by the focused light source to excite the material of the information layer to its second excited state. Upon excitation to its second excited state, a chemical or physical change results in the information layer. For example, naphthalocyanines can be easily oxidized when excited to their second excited state. This oxidation results in products which have totally different absorption spectra. On the other hand, excitation to the first excited state does not cause any chemical change in the medium.

The type of chemical or physical change which is induced in the information layer can be any of the types of changes known to the art which have been successfully used in the recordation of optical information. Suitable changes can include oxidation, isomerization, cyclization or pit-forming. Chemical changes are preferred, as changes on a molecular level, i.e., a micro change, are more preferable than changes on a macro level.

It is most preferred that in writing the information in the information layer the bits of information are recorded by changing the nature of the fluorescent dye in controlled spots of the information layer so the dye no longer fluoresces or fluoresces at a different wavelength, thereby essentially depleting the information layer of a detectable fluorescent dye in controlled spots. Thus, detectable fluoroscent dye will be present in the information layer only in those places where information has not been recorded. Upon reading the information, therefore, a bit of information will appear, or be read, whenever a decrease in fluorescence is noted.

While the foregoing description of recording information in accordance with the present invention has concerned the use of the scanning tunneling microscope to excite the material to its first excited state, it should be noted that this is not absolutely necessary, but merely preferred. Systems can be employed wherein the focused light source excites the material to its first excited state and the scanning tunneling microscope is used to impart the energy necessary to excite the material to its second excited state, and hence induce a chemical or physical change in the recording layer. The modulation of the focused light source would again effectively control the writing of the information since the focused light source can be modulated to not excite the material to its first excited state in those areas where information bits are not to be recorded. Without the excitation to the first excited state, the passage of the scanning tunneling microscope would provide insufficient energy to the material in order to cause an excitation to its second excited state.

As discussed previously, the focused light source can be focused on the surface of the information layer directly under the scanning tunneling microscope, or focused upon the tip of the scanning tunneling microscope. If the focused light source is focused upon the surface of the information layer, then the focused light source imparts the energy directly to the information layer material. However, if the focused light source is focused upon the scanning tunneling microscope tip, then the information is imparted indirectly. More specifically, by irradiating the tip of the scanning tunneling microscope with the focused light source, the additional energy is imparted to the electrons in the tip such that the tunneling of the electrons per se results in the chemical or physical change in the information layer of the medium in accordance with the information to be recorded. This physical process has been well studied and is described by Gao and Reifenberger in *Physical Review B*. Vol. 35, 8301 (1987). A combination of focusing on the tip and the information layer can also be successfully employed.

It should be further emphasized that the STM electron beam need not cause an excitation of the media to a second excited state in order to write. The use of systems employing materials in the information layer that exhibit two excitation levels is preferred due to the ability of such a system to be read easily and quickly. Media using a material in the information layer which exhibits but a single excitation level can also be used in the present invention. In such a case, it is most preferred that the focused light be focused on the STM tip in order to impart the additional energy necessary for writing to the electrons while still in the tip.

While the invention has been described with preferred embodiments, it is to be understood that variations and modifications may be resorted as will be apparent to those skilled in the art. Such variations and modifications are to be considered within the purview and the scope of the claims appended hereto.

What is claimed is:

1. In an optical information system, a method of recording information on an energy-sensitive substrate comprising passing the tip of a scanning tunneling microscope over the surface of said substrate and modulating a light source so that it selectively irradiates portions of said substrate in areas that are simultaneously subject to electromagnetic energy from said microscope wherein the microscope and light source cooperate to induce a stable detectable change in predetermined portions of the substrate corresponding to information that is recorded thereon by the foregoing process.

2. The method according to claim 1, wherein the substrate includes at its surface an organic information layer.

3. The method according to claim 2, wherein the organic information layer includes a naphthalocyanine compound.

4. The method according to claim 2, wherein the information layer includes a fluorescent dye.

5. The method according to claim 2, wherein the information layer includes a stilbene, azo-stilbene or anil compound.

* * * * *